United States Patent
Yamada et al.

(10) Patent No.: US 9,140,329 B2
(45) Date of Patent: Sep. 22, 2015

(54) TRANSMISSION BELT

(75) Inventors: Mitsuhiro Yamada, Yamatokoriyama (JP); Keiji Sakamoto, Yamatokoriyama (JP); Shinji Uchigashima, Yamatokoriyama (JP)

(73) Assignee: GATES CORPORATION, Denver, CO (US)

( * ) Notice: Subject to any disclaimer, the term of this patent is extended or adjusted under 35 U.S.C. 154(b) by 0 days.

(21) Appl. No.: 14/359,565

(22) PCT Filed: Feb. 1, 2012

(86) PCT No.: PCT/JP2012/052221
§ 371 (c)(1),
(2), (4) Date: May 20, 2014

(87) PCT Pub. No.: WO2013/077004
PCT Pub. Date: May 30, 2013

(65) Prior Publication Data
US 2014/0287862 A1    Sep. 25, 2014

(30) Foreign Application Priority Data
Nov. 21, 2011  (JP) .................................. 2011-253958

(51) Int. Cl.
*C08F 8/00*     (2006.01)
*C08F 283/00*   (2006.01)
(Continued)

(52) U.S. Cl.
CPC .. *F16G 1/10* (2013.01); *F16G 1/12* (2013.01); *F16G 1/28* (2013.01)

(58) Field of Classification Search
CPC ............... F16G 1/28; F16G 1/10; F16G 1/12; F16G 3/00

USPC ................................... 525/133, 540; 526/310
See application file for complete search history.

(56) References Cited

U.S. PATENT DOCUMENTS

| 6,838,141 B2 | 1/2005 | Ikemoto et al. |
| 7,396,884 B2 | 7/2008 | Achten |

(Continued)

FOREIGN PATENT DOCUMENTS

| CN | 101166918 A   | 4/2008 |
| DE | 102008055530 A1 | 6/2010 |

(Continued)

OTHER PUBLICATIONS

Japanese Patent Office, International Search Report PCT/JP2012/052221, mailing date Apr. 3, 2012.

(Continued)

*Primary Examiner* — William Cheung
(74) *Attorney, Agent, or Firm* — Paul N. Dunlap, Esq.; Jeffrey A. Thurnau, Esq.

(57) ABSTRACT

The durability of a belt is enhanced by improving the strength of rubber itself while enhancing its peeling strength with respect to a cord, a fabric or a short fiber. A toothed belt (10) comprises a belt body (13) that is integrally formed by a tooth rubber (11) provided on one surface side thereof, a backing rubber (12) provided on the other surface side, and an embedded cord (14) spirally wound in a boundary portion between the tooth rubber (11) and the backing rubber (12) that extends in the longitudinal direction of the belt. A facing fabric (20) covering the tooth rubber (11) is adhered to a surface of the tooth rubber (11), or one surface of the belt body (13). The tooth rubber (11) is obtained by vulcanization-molding a rubber composition including rubber such as HNBR, resorcinol, a melamine compound, silica and the like.

10 Claims, 5 Drawing Sheets

(51) Int. Cl.
*C08F 12/28* (2006.01)
*F16G 1/10* (2006.01)
*F16G 1/12* (2006.01)
*F16G 1/28* (2006.01)

(56) References Cited

U.S. PATENT DOCUMENTS

2006/0105873 A1  5/2006  Sato et al.
2008/0286529 A1* 11/2008  Sueto et al. ............... 428/167
2010/0203994 A1  8/2010  Fujikawa et al.

FOREIGN PATENT DOCUMENTS

| | | | |
|---|---|---|---|
| JP | 7-138879 A | 5/1995 | |
| JP | 2002-114875 A | 4/2002 | |
| JP | 2005-098470 A | 4/2005 | |
| JP | 2009-019663 A | 1/2009 | |
| JP | 2011-064257 A | 3/2011 | |

OTHER PUBLICATIONS

Durairaj, "Resorcinol: Chemistry, Technology, and Applications," Ch. 6, pp. 263-339 (2005) Springer, Berlin.
John V. Milewski Harry S. Katz "Handbook of Reinforcement for Plastics," Chs. 6, 10, 11, 12, pp. 103-104, 147-149, 154, 176, 183-185, 192-199, 201-204.
State Intellectual Property Office of P.R. China, Notification of First Office Action for CN application No. 201280011163.9, mailing date May 19, 2015.

* cited by examiner

TRANSMISSION BELT

This application is a U.S. National stage application of International Application No. PCT/JP2012/052221, filed Feb. 1, 2012, which claims priority to Japanese Patent Application No. 2011-253958 filed in Japan on Nov. 21, 2011, the contents of each of which are hereby incorporated herein by reference.

TECHNICAL FIELD

The present invention relates to a power transmission belt, and particularly to a toothed belt used in a high-temperature and high-load environment.

BACKGROUND ART

Toothed belts have been widely used for power transmission in internal combustion engines of automobiles, and the like. Recently, toothed belts have been increasingly used in high-temperature and high-load environments. That is, downsizing of engines or the like requires toothed belts to be used in environments with higher temperature and to be smaller in width. Conventionally, to enhance the durability of a toothed belt in a high-load environment, for example, a short fiber or the like is incorporated into the tooth rubber, and rubber with a relatively high modulus based on a so-called performing technology is used as the tooth rubber.

Furthermore, in a high-temperature environment the amount of deformation sustained by the teeth of a toothed belt increases. Hence, the amount of internal heat generation is increased, and consequently the toothed belt is more likely to thermally degrade. In addition, the rubber and the fabric at tooth root portions are repeatedly elongated to a great extent, and consequently cracks are more likely to occur in the toothed belt. Conventionally, the fabric, the short fiber, the cord, and the like are subjected to surface treatment with RFL, rubber cement, or the like for prevention of cracks and the like, so that the adhesive forces of rubber with these members are enhanced.

Moreover, as disclosed, for example, in Patent Document 1, a V-ribbed belt is known which has such a structure that a resorcin-formalin resin or a melamine resin is incorporated into an adhesion rubber to enhance the adhesive force between the cord and the adhesion rubber in which the cord is embedded.

Patent Document 1: Japanese Patent Application Publication No. 2008-261489

SUMMARY OF INVENTION

Technical Problems

Recently, an increasingly higher level of durability has been required in the market, and hence it has become difficult to sufficiently enhance durability to meet the required level by the use of only rubber of high strength and short fiber and by treating the surface of various members with RFL or rubber cement. In addition, a tooth rubber with a high modulus tends to lose adhesion to the fabric or the short fiber and experience weakening of the rubber at high temperature. Moreover, when a resorcin-formalin resin or a melamine resin is incorporated into the adhesion rubber as disclosed in Patent Document 1, the adhesive force can be improved, but the tear strength and the like of the rubber itself may be compromised, so that tooth shear, cracks, and the like are more likely to occur in some cases.

In this respect, an object of the present invention is to improve the adhesive force between rubber and various members, while enhancing the strength of the rubber itself by improving the tear strength and the like also under high-temperature conditions, and to thereby improve the durability of a belt used in a high-load and high-temperature environment.

Solution to Technical Problems

A power transmission belt according to the present invention comprises a rubber portion which is molded by vulcanizing a rubber composition including rubber, resorcinol and a melamine compound.

In general, the rubber portion is adhered to a cord or fabric, or includes a short fiber embedded therein. Here, an aramid short fiber is preferably embedded within the rubber portion. In addition, the rubber preferably includes a hydrogenated nitrile rubber. Moreover, the rubber composition preferably further includes silica. Furthermore, at least one of the cord, the fabric and the short fiber preferably is subjected to RFL treatment, and includes RFL components adhered onto the surface thereof.

The power transmission belt is preferably a toothed belt with tooth rubber. In addition, the rubber portion preferably constitutes at least a part of the tooth rubber. Meanwhile, a hexamethoxy methylol melamine compound is preferably used as the melamine compound. Note that the hexamethoxy methylol melamine compound is, for example, hexamethoxy methylol melamine, a partial condensate oligomer thereof, or a mixture thereof.

For example, the toothed belt includes a cord, a tooth rubber disposed on one surface side, a backing rubber disposed on the other surface side, and a facing fabric covering the one surface side of the tooth rubber, the one surface side and the other surface side being located across the cord from one another. In this case, at least the one surface side of the tooth rubber is formed by the rubber portion, and the facing fabric is adhered to the rubber portion.

A method of manufacturing a power transmission belt according to the present invention comprises molding a rubber portion constituting at least a part of the power transmission belt by vulcanizing a rubber composition including rubber, resorcinol and a melamine compound.

Advantageous Effects of Invention

In the present invention, the specific internal adhesive agents are incorporated into the rubber composition. Hence, the durability of the belt can be improved by improving the strength of the rubber itself, while enhancing the adhesion strength of the rubber to the cord, the fabric, the short fiber, and the like.

LIST OF REFERENCE NUMBERS 10 toothed belt (power transmission belt)
11 tooth rubber
12 backing rubber
13 belt body
14 cord
20 facing fabric (fabric)

DESCRIPTION OF EMBODIMENTS

Hereinafter, embodiments of the present invention are described with reference to the drawings.

Figure 1:
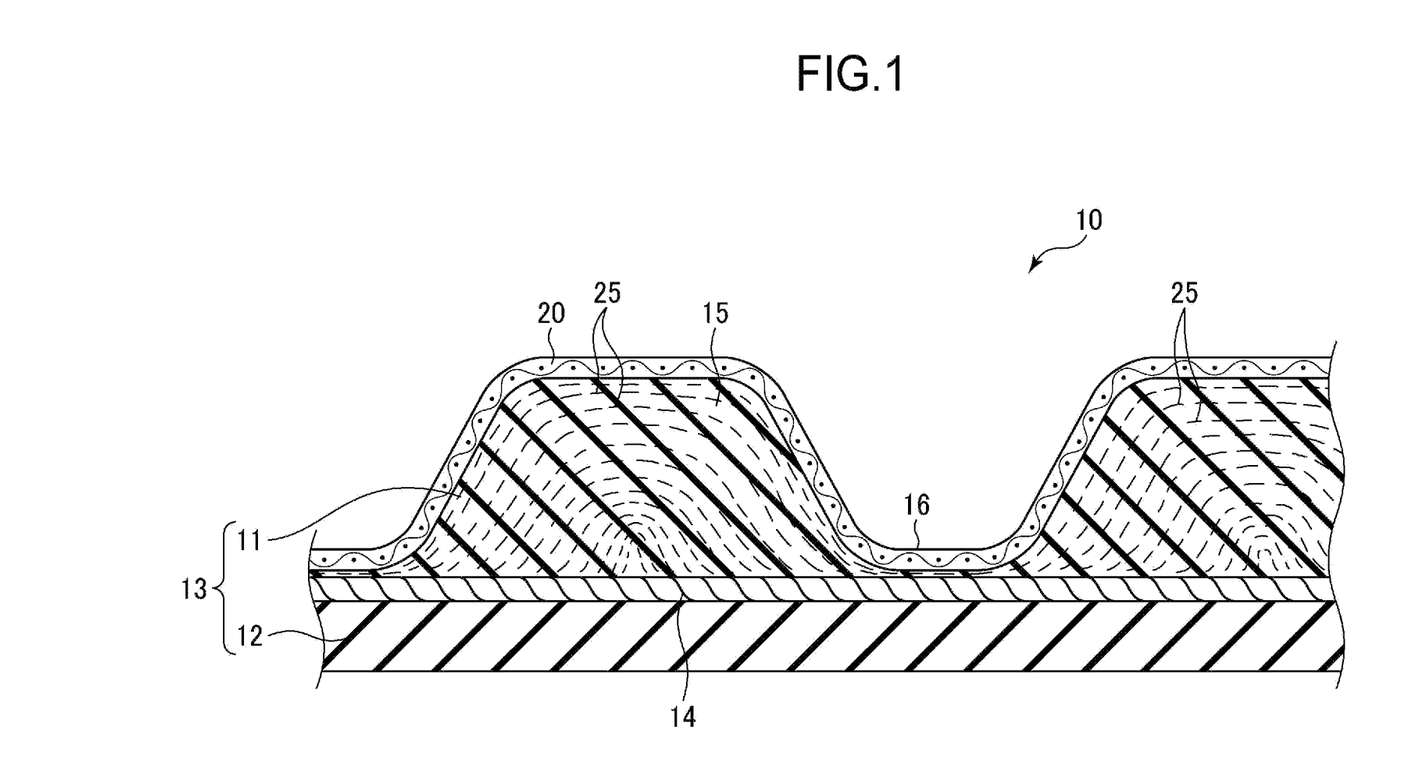
FIG. 1 is a cross-sectional view of a toothed belt according to a first embodiment of the present invention.

FIG. 1 shows a toothed belt of a first embodiment of the present invention. The toothed belt 10 is formed in an endless shape, and is used by being wound around driven and driving pulleys (not illustrated) in an internal combustion engine or the like, for example. The toothed belt 10 is a timing belt which transmits torque (driving force) from a driving pulley to a driven pulley by synchronous power transmission.

The toothed belt 10 includes a belt body 13 and a cord 14. The belt body 13 is integrally formed by a tooth rubber 11 provided on one surface side thereof and a backing rubber 12 provided on the other surface side. The cord 14 is spirally wound and embedded in a boundary portion between the tooth rubber 11 and the backing rubber 12, and embedded to extend in the longitudinal direction of the belt. The cord 14 is adhered to the tooth rubber 11 and the backing rubber 12.

In the tooth rubber 11, a tooth portion 15 and a tooth bottom portion 16 are alternately formed on the one surface side of the belt body 13 along the longitudinal direction of the belt. A facing fabric (fabric) 20 covering the tooth rubber 11 (the tooth portion 15 and the tooth bottom portion 16) is adhered onto a surface of the tooth rubber 11 (i.e., one surface of the belt body 13).

A short fiber 25 made of a nylon fiber, a modified nylon fiber obtained by modifying nylon, an aramid fiber, or the like, and having a fiber length of about 0.5 to 10 mm is loaded in the tooth rubber 11. An aramid short fiber is preferably loaded in the tooth rubber 11, to further increase the modulus of the tooth rubber 11. Moreover, when an aramid fiber is loaded, two internal adhesive agents described later are more likely to improve physical properties of the rubber such as tear strength and adhesion strength of the rubber with the short fiber 25 and the like. The short fiber 25 is loaded, for example, in an amount of about 4 to 36 parts by weight, preferably about 10 to 25 parts by weight, and particularly preferably about 12 to 16 parts by weight in the tooth rubber 11, relative to 100 parts by weight of a matrix described later.

The short fiber 25 is preferably subjected to treatment with a treatment agent including a resin component capable of reacting with the internal adhesive agents described later, and is preferably subjected to, for example, RFL (resorcin-formalin-latex) treatment. The RFL treatment is conducted by impregnation treatment, in which the short fiber is immersed in an RFL treatment liquid and then dried under heating. The RFL treatment liquid includes latex and a resorcin-formaldehyde condensate, which are diluted with, for example, water or the like. Moreover, the resin component may be a urethane resin or an epoxy resin.

The short fiber 25 is oriented substantially in the thickness direction of the belt in a central region of the tooth portion 15. As the short fiber 25 approaches the tooth surface from the central region, the orientation of the short fiber 25 becomes inclined from the thickness direction so as to extend along the tooth surface. The short fiber 25 is oriented substantially in the longitudinal direction of the belt near the top portion of the tooth portion 15 and the tooth bottom portion 16.

The tooth rubber 11 is obtained by vulcanizing and molding a rubber composition including rubber and various additives. The rubber composition includes a hydrogenated nitrile rubber (HNBR) as the main component of the rubber, and may include other rubber components such as a hydrogenated carboxylic nitrile rubber (HXNBR) and a nitrile rubber (NBR).

The rubber composition used to mold the tooth rubber 11 preferably includes a metal $\alpha,\beta$-ethylenic unsaturated carboxylate as a matrix, in addition to the rubber. However, the metal $\alpha,\beta$-ethylenic unsaturated carboxylate does not have to be included. The metal $\alpha,\beta$-ethylenic unsaturated carboxylate is included, for example, in an amount of about 0.2 to 0.4 relative to the matrix (the total weight of the rubber and the metal $\alpha,\beta$-ethylenic unsaturated carboxylate).

The metal $\alpha,\beta$-ethylenic unsaturated carboxylate is formed by ionic bonding of an $\alpha,\beta$-ethylenic unsaturated carboxylic acid with a metal. For example, a monocarboxylic acid such as acrylic acid or methacrylic acid, or a dicarboxylic acid such as maleic acid, fumaric acid, itaconic acid, or citraconic acid is used as the $\alpha,\beta$-ethylenic unsaturated carboxylic acid, and methacrylic acid is preferably used. For example, zinc, magnesium, calcium, barium, titanium, chromium, iron, cobalt, nickel, aluminum, tin, lead, or the like is used as the metal, and zinc is preferably used. Thus, for example, zinc dimethacrylate is used as the metal salt.

The rubber composition used to mold the tooth rubber 11 further includes resorcinol and a melamine compound as the internal adhesive agents. In this embodiment, the inclusion of these compounds leads to polymerization of the melamine compound and resorcinol, for example, upon the heating during the molding by vulcanization, and in turn during construction of a network structure. Consequently, the tear strength and the like of the tooth rubber 11 is enhanced, and the adhesion strength of the tooth rubber 11 to the cord 14, the facing fabric 20, and the short fiber 25 is also enhanced.

The melamine compound is, for example, a melamine compound having at least partially methoxymethylated amino groups. Specific examples of the melamine compound include hexamethoxy methylol melamine compounds such as hexamethoxy methylol melamine, partial condensate oligomers thereof, and mixtures thereof. The melamine compound preferably has a viscosity at 25° C. (according to DIN19268) of about 3000 to 8000 mPa·s.

Resorcinol is incorporated in an amount of 0.3 to 8 parts by weight, preferably 0.5 to 4.5 parts by weight, and more preferably 1.5 to 3.0 parts by weight relative to 100 parts by weight of the matrix of the rubber composition. In addition, the incorporated parts (weight) of the melamine compound are preferably smaller than those of resorcinol. The melamine compound is incorporated in an amount of 0.2 to 5 parts by weight, preferably 0.3 to 2.7 parts by weight, and more preferably 0.9 to 1.8 parts by weight relative to 100 parts by weight of the matrix of the rubber composition. If the incorporated amount of any of the melamine compound and resorcinol exceeds the above-described range, the tear strength, breaking strength, and the like tends to be poor. On the other hand, if the incorporated amount is lower than the above-described range, the adhesion strength is hard to improve.

The rubber composition used to mold the tooth rubber 11 preferably includes silica. Silica in the form of fine particles, powder, or the like is used. In this embodiment, water contained in the silica causes the melamine compound to donate formaldehyde. Then, resorcinol is polymerized with the formaldehyde, and the melamine compound is also polymerized. Consequently, the adhesive force, tear strength, and the like are improved as described above. The amount of the silica is 5 to 50 parts by weight, and preferably 20 to 40 parts by weight, relative to 100 parts by weight of the matrix of the rubber composition.

The rubber composition used to mold the tooth rubber 11 further includes known additives for rubber such as a vulcanizing agent, a plasticizer, a lubricant, and carbon black. In this embodiment, an organic peroxide-based vulcanizing agent is preferably used as the vulcanizing agent.

Although not particularly limited, the facing fabric 20 is, for example, a fabric including first threads (for example, weft threads) extending along the longitudinal direction of the belt and second threads (for example, warp threads) extending along the width direction of the belt, which are woven. In the facing fabric 20, for example, the first threads are constituted of elastic threads, and the second threads are constituted of non-elastic threads. Thus, the facing fabric 20 is elastic in the longitudinal direction of the belt, and is more easily molded into a corrugated shape in preforming. In this embodiment, at least a part of the fiber constituting the facing fabric 20 is preferably an aramid fiber to improve the strength of the belt surface, and, for example, at least some of the first threads are preferably an aramid fiber. In addition, the facing fabric 20 is subjected to impregnation treatment or the like, such as RFL treatment, if necessary.

The rubber composition used to mold the tooth rubber 11 is prepared as follows. First, additives such as the short fiber, silica and the like for the rubber composition other than the vulcanizing agent and internal adhesive agents (resorcinol and the melamine compound), are kneaded with the rubber preferably at a temperature higher than the temperature for the primary kneading described below. Subsequently, the internal adhesive agents are added, and the mixture is further kneaded (primary kneading). In this primary kneading, the kneading temperature is preferably 100° C. or higher. The kneading at this temperature results in the release of water from the silica to the composition, and facilitates the donation of formaldehyde from the melamine compound in the above-described manner. Further, the vulcanizing agent is added to the primary kneaded mixture, and the resultant mixture is kneaded at a temperature lower than the vulcanization temperature of the vulcanizing agent (lower than the kneading temperature for the primary kneading). Thus, the rubber composition is obtained (secondary kneading). The rubber composition is shaped into a sheet, and used as a tooth rubber sheet 11' (see FIG. 2). However, the method of kneading the rubber is not limited to this method, and for example, the additives other than the vulcanizing agent may be added in the primary kneading or the secondary kneading, as appropriate.

As the backing rubber 12, rubber used as the backing rubber for a conventionally known toothed belt may be used, and the backing rubber 12 preferably does not load short fiber. In addition, the rubber used as the backing rubber 12 is preferably mainly made of HNBR as in the case of the tooth rubber 11, and may include other rubber components, if necessary.

Figure 2:
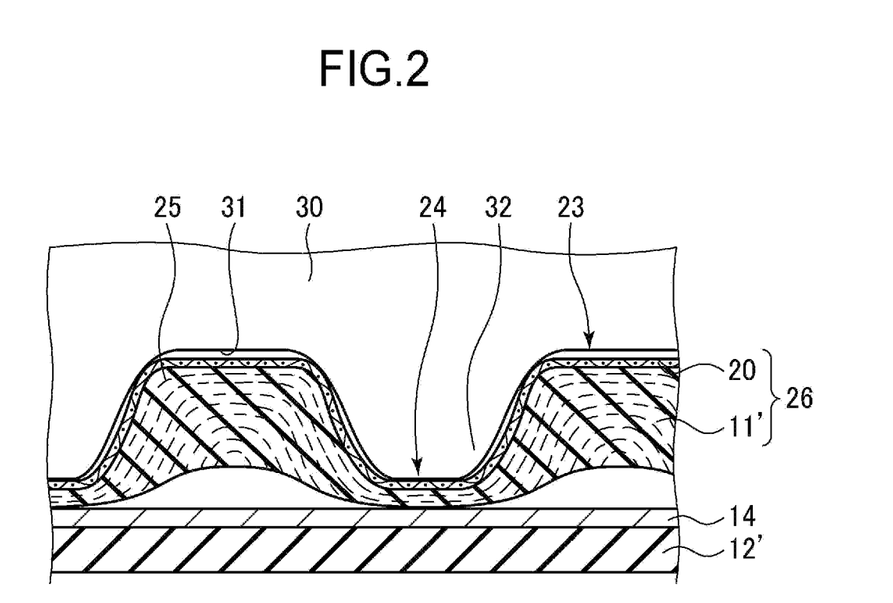
FIG. 2 is a cross-sectional view showing a method of manufacturing a toothed belt according to the first embodiment of the present invention.

Next, a method of manufacturing the toothed belt 10 of this embodiment is descried based on FIG. 2. In this embodiment, the facing fabric 20 subjected to the impregnation treatment or the like is first preformed by a conventionally known method into a corrugated shape having an alternating tooth portion 23 and tooth bottom portion 24.

Subsequently, the tooth rubber sheet 11' is adhered under pressure onto one surface of the facing fabric 20 having the corrugated shape. Thus, a rubber-provided facing fabric 26 is obtained. The tooth rubber sheet 11' is pressed against the facing fabric 20. Hence, the tooth rubber sheet 11' adhered under pressure is relatively thick on the tooth portion 23, and relatively thin on the tooth bottom portion 24. Moreover, the short fiber 25 loaded in the tooth rubber sheet 11', which has been incorporated along the longitudinal direction, is inclined as appropriate while being adhered under pressure, as is apparent from FIG. 2, and is oriented in substantially the same manner as that of the short fiber in the toothed belt 10.

The thus obtained rubber-provided facing fabric 26 is wound around a toothed mold 30. The toothed mold 30 has a cylindrical shape, and has an outer peripheral surface on which recessed portions 31 and raised portions 32 are alternately provided along the circumferential direction. Each tooth portion 23 of the rubber-provided facing fabric 26 is disposed inside a corresponding recessed portion 31. Note that, in general, each tooth portion 23 of the rubber-provided facing fabric 26 has a shape which is not completely fitted to the recessed portion 31, and a space exists between the tooth portion 23 and the recessed portion 31.

Subsequently, the cord 14 is spirally wound around the tooth rubber sheet 11', and a backing rubber sheet 12' is further wound around the cord 14. After that, the toothed mold 30 is housed in a vulcanization chamber (not illustrated). Note that the tooth rubber sheet 11' and the backing rubber sheet 12' are unvulcanized rubber sheets to be converted into the tooth rubber 11 and the backing rubber 12 after vulcanization molding.

In the vulcanization chamber, the rubber-provided facing fabric 26 and the like, which are wound around the toothed mold 30, are heated with steam, for example, and are pressurized from the outside to the inside with a vulcanization bag or the like provided in the vulcanization chamber. As a result of the pressurization and heating, the spaces inside the recessed portions 31 are completely eliminated, and the facing fabric 20, the rubber sheets 11' and 12', and the cord 14 are integrated with each other by vulcanization of the rubber sheets 11' and 12' and the like. Thus, a belt slab is molded. The belt slab is demolded from the toothed mold 30, subjected as appropriate to grinding or the like, and then cut into a piece having a predetermined width. Thus, the toothed belt 10 (see FIG. 1) is obtained.

In this embodiment, the incorporation of the above-described two internal adhesive agents into the tooth rubber 11 as described above improves the strength such as the tear strength of the rubber itself, and also improves the adhesive force to the cord 14, the facing fabric 20, and the short fiber 25. Hence, the durability of the belt is improved even in a high-temperature and high-load environment.

Figure 3:
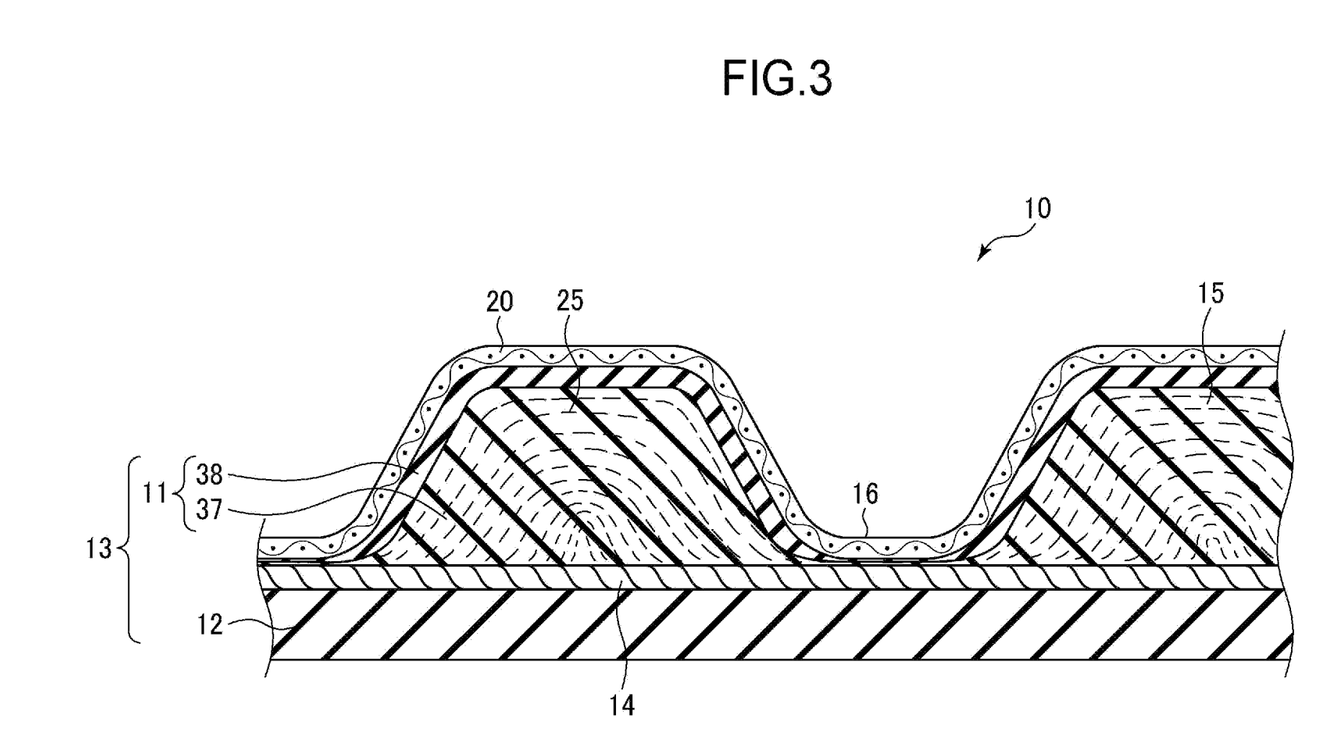
FIG. 3 is a cross-sectional view of a toothed belt according to a second embodiment of the present invention.

FIG. 3 shows a toothed belt according to a second embodiment of the present invention. The second embodiment is the same as the first embodiment, except for the structure of the tooth rubber. Differences of the second embodiment from the first embodiment are described below.

In the second embodiment, the tooth rubber 11 includes a core rubber portion 37 and a tooth surface rubber portion 38. The core rubber portion 37 accounts for a large proportion of the tooth portion 15, is laminated on the backing rubber 12, and has a shape matching the shape of the tooth portion 15. The tooth surface rubber portion 38 is thin, is laminated on the core rubber portion 37, and is disposed on a surface of the tooth rubber 11. In addition, the facing fabric 20 covers and is adhered to the outer peripheral surface of the tooth surface rubber portion 38.

In this embodiment, the tooth surface rubber portion 38 is obtained by molding the same rubber composition as that of the tooth rubber 11 in the first embodiment, except that short fiber is not incorporated. In other words, the tooth surface rubber portion 38 is molded by using a rubber composition into which silica, resorcinol, the melamine compound, and the like are incorporated. On the other hand, the core rubber portion 37 is obtained by molding a rubber composition having the same constitution as that of the tooth rubber 11 of the first embodiment, except that resorcinol and the melamine compound are not incorporated. Note that, since the material, the orientation, and the like of the short fiber 25 in the core rubber portion are the same as those in the first embodiment, descriptions thereof are omitted.

In this embodiment, the above-described two internal adhesive agents are incorporated into the tooth surface rubber portion 38 as described above. Hence, it is possible to improve the adhesion strength of the tooth rubber 11 to the facing fabric 20, and also to improve the rubber strength of the tooth rubber 11 near the tooth surface. Moreover, since the tooth surface rubber 38 is provided, the adhesion between the facing fabric 20 and the tooth rubber 11 is not obstructed by the short fiber, and the adhesion strength in between is more likely to be improved.

Note that, in this embodiment, the core rubber portion 37 may be obtained by molding a rubber composition into which resorcinol, the melamine compound, and the like are incorporated, as in the case of the tooth surface rubber portion 38. Moreover, the method of manufacturing a toothed belt of this embodiment is the same as that of the first embodiment, except that the two layers (the tooth surface rubber sheet and the core rubber sheet) are adhered under pressure to the facing fabric, instead of the rubber sheet. Hence, descriptions thereof are omitted.

Note that, in each of the above described embodiments, the rubber constituting each of the tooth rubber 11 and the backing rubber 12 may include rubber components such as EPDM (ethylene-propylene-diene copolymer), other than HNBR, NBR, and HXNBR described above, or may include a rubber component other than HNBR as the main component.

Moreover, in each of the above-described embodiments, the facing fabric 20 and the cord 14 each preferably have surfaces to which a resin component capable of reacting with the internal adhesive agents is attached by, for example, subjecting the facing fabric 20 and the cord 14 to RFL treatment or the like, as in the case of the short fiber 25.

EXAMPLES

Examples are shown below as specific examples of the present invention. However, the present invention is not limited to the Examples shown below.

In each of the Examples and Comparative Examples, a rubber composition having the constitution shown in Table 1 was obtained as follows. Specifically, the additives other than the vulcanizing agent and the internal adhesive agents (resorcinol and the hexamethoxy methylol melamine compound) shown in Table 1 were added to a matrix, and the mixture was kneaded at 120 to 160° C. Then, the internal adhesive agents were added thereto, and the mixture was kneaded at 100 to 130° C. (primary kneading). Further, the vulcanizing agent was added thereto, and the mixture was subjected to the secondary kneading below 100° C.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Matrix | RBDM | | — | — | — | — | — | — | — | — | — | — |
| | HXNBR | | — | — | 15 | — | — | — | — | — | — | — |
| | Zinc dimethacrylate-containing HNBR | | 100 | 100 | 100 | 100 | 100 | 100 | 100 | 100 | 100 | 100 |
| | ZDMA | | — | — | — | — | — | — | — | — | — | — |
| Short fiber | Aramid short fiber (untreated) | | — | — | — | — | — | — | — | — | — | 12 |
| | Aramid short fiber | | 16 | 12 | 16 | 12 | 12 | 12 | 12 | 8 | 4 | — |
| Internal adhesive agents | Bexamethoxy methylol melamine compound (B) | | 0.9 | 0.9 | 0.9 | 0.45 | 1.8 | 2.7 | 3.6 | 0.9 | 0.9 | 0.9 |
| | Resorcinol (A) | | 1.5 | 1.5 | 1.5 | 0.75 | 3 | 4.5 | 6 | 1.5 | 1.5 | 1.5 |
| Other additives | Carbon black | | 10 | 10 | 10 | 10 | 10 | 10 | 10 | 10 | 10 | 10 |
| | Silica | | 30 | 30 | 30 | 30 | 30 | 30 | 30 | 30 | 30 | 30 |
| | Plasticizer | | 8 | 8 | 8 | 8 | 8 | 8 | 8 | 8 | 8 | 8 |
| | Stearic acid | | 1.5 | 1.5 | 1.5 | 1.2 | 2.3 | 2.7 | 3.1 | 1.5 | 1.5 | 1.5 |
| | Co-crosslinking agent | | 4 | 4 | 4 | 4 | 4 | 4 | 4 | 4 | 4 | 4 |
| | Antioxidant | | 3 | 3 | 3 | 3 | 3 | 3 | 3 | 3 | 3 | 3 |
| | Vulcanizing agent (Organic peroxide-based) | | 12 | 12 | 12 | 12 | 12 | 12 | 12 | 12 | 12 | 12 |
| Total | | | 186.9 | 182.9 | 201.9 | 181.4 | 186.1 | 188.9 | 191.7 | 178.9 | 174.9 | 182.9 |
| B/A (weight ratio) | | | 0.59 | 0.59 | 0.59 | 0.59 | 0.59 | 0.59 | 0.59 | 0.59 | 0.59 | 0.59 |
| Tensile stress at break ($TS_b$) | Normal | MPa | 26.2 | 24.1 | 24.4 | 21.03 | 21.23 | 20.2 | 21.23 | 21 | 23.6 | 19.8 |
| | Hot 120° C. | MPa | 13.9 | 14.8 | 15.9 | 11.51 | 11.43 | 9.37 | 8.42 | 9.01 | 7.97 | 11.8 |
| | Retention ratio % (Hot\Normal × 100) | | 53 | 61 | 65 | 55 | 34 | 46 | 40 | 43 | 34 | 60 |
| Tear strengths (TR) | Normal | N/mm | 90.2 | 83.3 | 88.1 | 86.6 | 88.2 | 90.33 | 89.7 | 85.8 | 73.3 | 65.7 |
| | Hot (120° C.) | N/mm | 47.8 | 42.7 | 4.61 | 39.9 | 46.8 | 46.22 | 41.9 | 3.54 | 34.6 | 39.8 |
| | Retention ratio % (Hot/Normal × 100) | | 53 | 51 | 52 | 46 | 53 | 51 | 47 | 41 | 47 | 61 |
| Peeling strength to facing fabric ($T_F$) | Normal | N/mm | 164 | 145 | 140 | 145 | 189 | — | 188 | 225 | 198 | 137 |
| | Hot (120° C.) | N/mm | 61 | 62 | 65 | 60 | 64 | — | 55 | 70 | 66 | 54 |
| Peeling strength to cords ($T_F$) | Normal | N/mm | 161 | 157 | — | — | — | — | — | 169 | 171 | 179 |
| | Hot (120° C.) | N/mm | 80 | 91 | — | — | — | — | — | 93 | 95 | 83 |
| Peeling strength of fabric | Tooth top | N/19.1 mm | 309.4 | — | — | — | — | — | — | — | — | — |

TABLE 1-continued

| | | | Ex. 11 | Ex. 12 | Ex. 13 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|
| Matrix | RBDM | | — | 100 | 100 | — | — | — | — | — | 100 |
| | HXNBR | | — | — | — | — | — | — | 15 | — | — |
| | Zinc dimethacrylate-containing HNBR | | 100 | — | — | 100 | 100 | 100 | 100 | 100 | — |
| | ZDMA | | — | 14 | 14 | — | — | — | — | — | 14 |
| Short fiber | Aramid short fiber (untreated) | | — | — | — | — | — | — | — | — | — |
| | Aramid short fiber | | — | — | — | 16 | 12 | 8 | 16 | — | — |
| Internal adhesive agents | Bexamethoxy methylol melamine compound (B) | | 0.9 | 1.7 | 3.4 | — | — | — | — | — | — |
| | Resorcinol (A) | | 1.5 | 2.8 | 5.7 | — | — | — | — | — | — |
| Other additives | Carbon black | | 10 | 5 | 5 | 10 | 10 | 10 | 10 | 10 | 5 |
| | Silica | | 30 | 40 | 40 | 30 | 30 | 30 | 30 | 30 | 40 |
| | Plasticizer | | 8 | — | — | 8 | 8 | 8 | 8 | 8 | — |
| | Stearic acid | | 1.5 | 1.5 | 3 | 1.5 | 1.5 | 1.5 | 1.5 | 1.5 | — |
| | Co-crosslinking agent | | — | 0.1 | 0.1 | 4 | 4 | 4 | 4 | — | 0.1 |
| | Antioxidant | | 3 | 1 | 1 | 3 | 3 | 3 | 3 | 3 | 1 |
| | Vulcanizing agent (Organic peroxide-based) | | 16 | 6 | 6 | 12 | 1 | 12 | 12 | 16 | 6 |
| Total | | | 170.9 | 172.1 | 178.2 | 184.5 | 180.5 | 176.5 | 199.5 | 168.5 | 166.1 |
| B/A (weight ratio) | | | 0.59 | 0.59 | 0.59 | 0 | 0 | 0 | 0 | 0 | 0 |
| Tensile stress at break ($TS_b$) | Normal | MPa | 22.8 | 18.7 | 16.6 | 25.8 | 20.4 | 24.5 | 17.5 | 26.6 | 18.2 |
| | Hot 120° C. | MPa | 9.7 | 10.6 | 8.83 | 13.8 | 8.6 | 8.2 | 10.1 | 8.8 | 10 |
| | Retention ratio % (Hot\Normal × 100) | | 43 | 57 | 53 | 53 | 42 | 33 | 58 | 33 | 53 |
| Tear strength (TR) | Normal | N/mm | 69.0 | 56 | 56.2 | 91.4 | 80.3 | 73.3 | 86.5 | 70.9 | 58.4 |
| | Hot (120° C.) | N/mm | 32.9 | 27.2 | 26.6 | 41 | 36.7 | 32.7 | 37.7 | 35.7 | 28.8 |
| | Retention ratio % (Hot/Normal × 100) | | 47 | 49 | 47 | 45 | 46 | 45 | 44 | 50 | 49 |
| Peeling strength to facing fabric ($T_F$) | Normal | N/mm | Rubber break | — | — | 136 | — | — | 112 | Rubber break | — |
| | Hot (120° C.) | N/mm | Rubber break | — | — | 55 | — | — | 48 | Rubber break | — |
| Peeling strength to cords ($T_F$) | Normal | N/mm | 226* | 98* | 121* | 151 | — | — | — | 184* | 110* |
| | Hot (120° C.) | N/mm | 79* | 57* | 57* | 71 | — | — | — | 65* | 57* |
| Peeling strength of fabric | Tooth top | N/19.1 mm | — | — | — | 150 | — | — | — | — | — |

*1 "—" indicate that the item was not incorporated, or not determined.
*2 The numeric value of the matrix and each of the additives such as short fiber indicates an amount in parts by weight.
*3 The zinc dimethacrylate-containing HNBR was obtained by mixing in advance zinc dimethacrylate and HNBR at a weight ratio of 80:20. In addition, the HNBR had a hydrogenation percentage of 96%.
*4 Technora (product name), which is a para-type aramid short fiber with a fiber length of 1 mm, was used as the aramid short fiber. Note that, in Table 1, the "aramid short fiber" indicates an aramid short fiber subjected to RFL treatment (RF/L weight ratio = 1/5, NBR latex was used as the latex), and the aramid short fiber (untreated) indicates an aramid short fiber not subjected to any impregnation treatment such as RFL treatment.
*5 The hexamethoxy methylol melamine compound used was a partial condensate oligomer of hexamethoxy methylol melamine, having a viscosity at 25° C. (according to DIN19268) of 5500 mPa · s.
*6 *in Table 1 indicates that an aramid cord was used as the cord.

[Evaluation of Physical Properties of Rubber Compositions]

The physical properties of the rubber composition of each of the Examples and Comparative Examples were evaluated as follows. Table 1 shows the results.

[Tensile Stress at Break ($TS_b$)]

Rubber samples with the dumbbell shape No. 5 were prepared by vulcanizing and molding the rubber composition of each of the Examples and Comparative Examples at 160° C. for 20 minutes under a pressure of 150 kgf. By using the rubber samples, the tensile stress at break ($TS_b$) was measured under a normal environment (23° C.) and a hot environment (120° C.) in accordance with JIS K6251. Note that the short fiber was oriented along the direction of tension in the rubber samples.

[Tear Strength (TR)]

Vulcanized rubber samples, namely "unnicked angle-shaped test pieces" were prepared from the rubber composition of each of the Examples and Comparative Examples under the same vulcanization conditions as those in the tensile stress at break ($TS_b$). By using the rubber samples, tear strength (TR) was measured under a normal environment (23° C.) and a hot environment (120° C.) in accordance with JIS K6252.

[Peeling Strength to Facing Fabric ($T_F$)]

Samples were each obtained by adhering an unvulcanized rubber sheet made from the rubber composition of each of the Examples and Comparative Examples to a facing fabric at a vulcanization temperature of 160° C. for 20 minutes under a pressure of 40 kgf. By using the samples (25 mm in width), the peeling strength ($T_F$) of the vulcanized rubber with respect to the facing fabric was measured under a normal environment (23° C.) and a hot environment (120° C.) in accordance with JIS K6256-1.

Note that the facing fabric used in this measurement was a woven fabric in which the warp threads and the weft threads were woven into a 2/2 twill, and which was subjected to RFL treatment (RF/L weight ratio=1/5, NBR latex was used as the latex). Here, the warp threads were non-elastic threads constituted of 110-dtex nylon filament yarns. The weft threads were elastic threads constituted of composite yarns in which intermediate yarns made of 220-dtex para-aramid fiber yarns (product name: Technora) were wound around core yarns made of 470-dtex urethane elastic yarns, and cover yarns made of 110-dtex nylon fiber were further wound around the intermediate yarns. Note that the weft threads extended along the longitudinal direction of the sample, and the grain direction of the short fiber was the same as the longitudinal direction of the sample.

[Peeling Strength to Cord ($T_F$)]

Samples were each obtained by aligning cords along the longitudinal direction of an unvulcanized rubber sheet made from the rubber composition of each of the Examples and Comparative Examples, placing a supporting fabric on the cords, and integrating these materials with each other at 160° C. for 20 minutes under a pressure of 40 kgf. By using the samples (25 mm in width), the peeling strength ($T_F$) of the rubber to the cord was measured under a normal environment (23° C.) and a hot environment (120° C.) in accordance with JIS K6256-1. Note that aramid cords were used as the cords in Examples 11 to 13 and Comparative Examples 5 and 6, and glass cords were used as the cords in the other Examples and Comparative Examples.

[Belt Performance Evaluation]

As for each of Example 1 and Comparative Example 1, toothed belts were prepared according to the first embodiment, and the performances of the belts were evaluated as described below. Specifically, the same facing fabric as that used in the above-described adhesion test was subjected to RFL treatment in the same manner, and then preformed into a corrugated shape, so that the weft threads extended along the longitudinal direction of the belt. In addition, a tooth rubber sheet made from the rubber composition having the constitution of Table 1 was adhered under pressure to the facing fabric. Thus, a rubber-provided facing fabric was obtained. Subsequently, the rubber-provided facing fabric, a glass cord, and a backing rubber sheet were wound around a toothed mold in this order, and molded by vulcanization in a vulcanization chamber. Thus, a belt slab was obtained. The belt slab was cut, and RU-toothed belts having 92 teeth and a belt width of 19.1 mm were obtained. Note that the backing rubber sheets used in Example 1 and Comparative Example 1 were backing rubber sheets made from the same rubber composition including HNBR as the rubber component, but excluding short fiber and any internal adhesive agents incorporated thereinto.

[Peeling Strength of Fabric]

The toothed belt of each of Example 1 and Comparative Example 1 was cut into a strip shape, and a nick was formed in the facing fabric. Then, the facing fabric was peeled from the tooth rubber along the longitudinal direction at a tensile speed of 50 mm/minute, and the force required for peeling at the top of a tooth was regarded as the peeling strength of the fabric. Table 1 shows the results.

[High-Load Durability Test]

Figure 4:
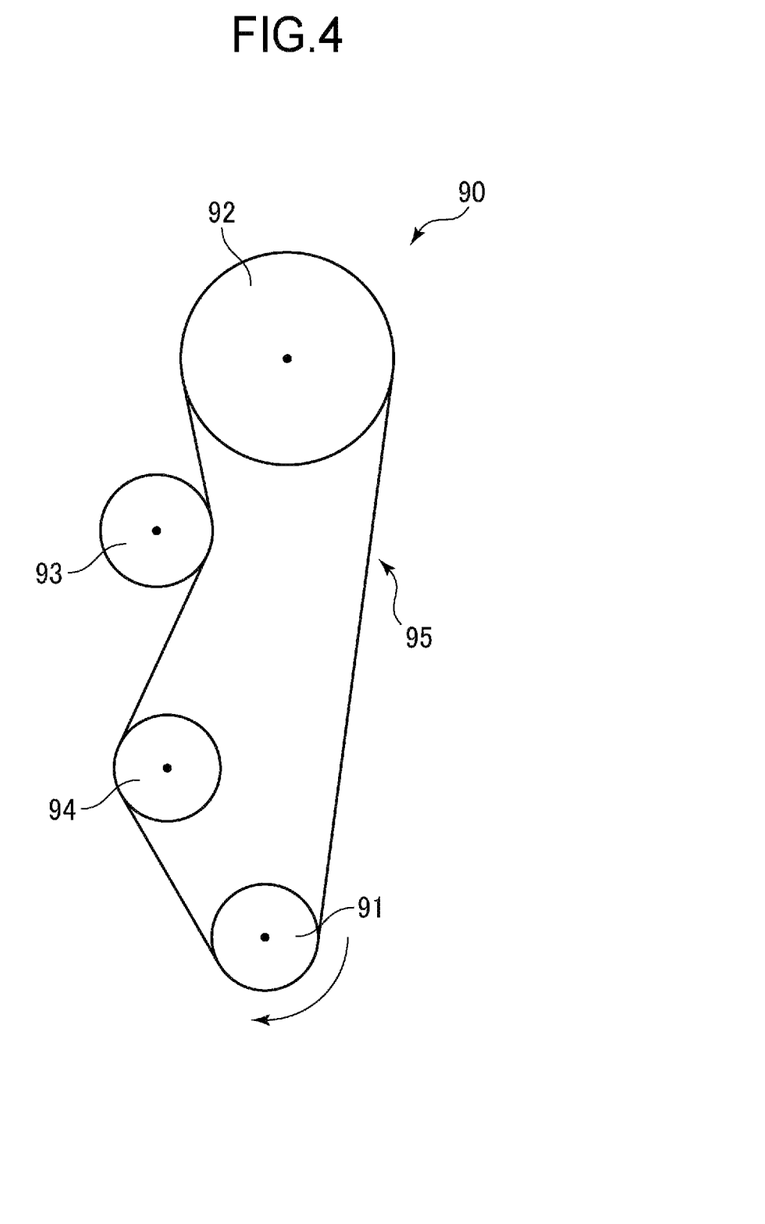
FIG. 4 shows the layout of a high-load durability test.

Each of the toothed belts of Example 1 and Comparative Example 1 was evaluated for durability under high load by a high-load durability test. FIG. 4 shows a drive test device 90 used in the high-load durability test. The drive test device 90 has a driving toothed pulley 91 having 18 teeth, a driven toothed pulley 92 having 36 teeth, an idler pulley 93 having a pulley diameter of 55 mm, and an idler toothed pulley 94 having 18 teeth.

Figure 5:
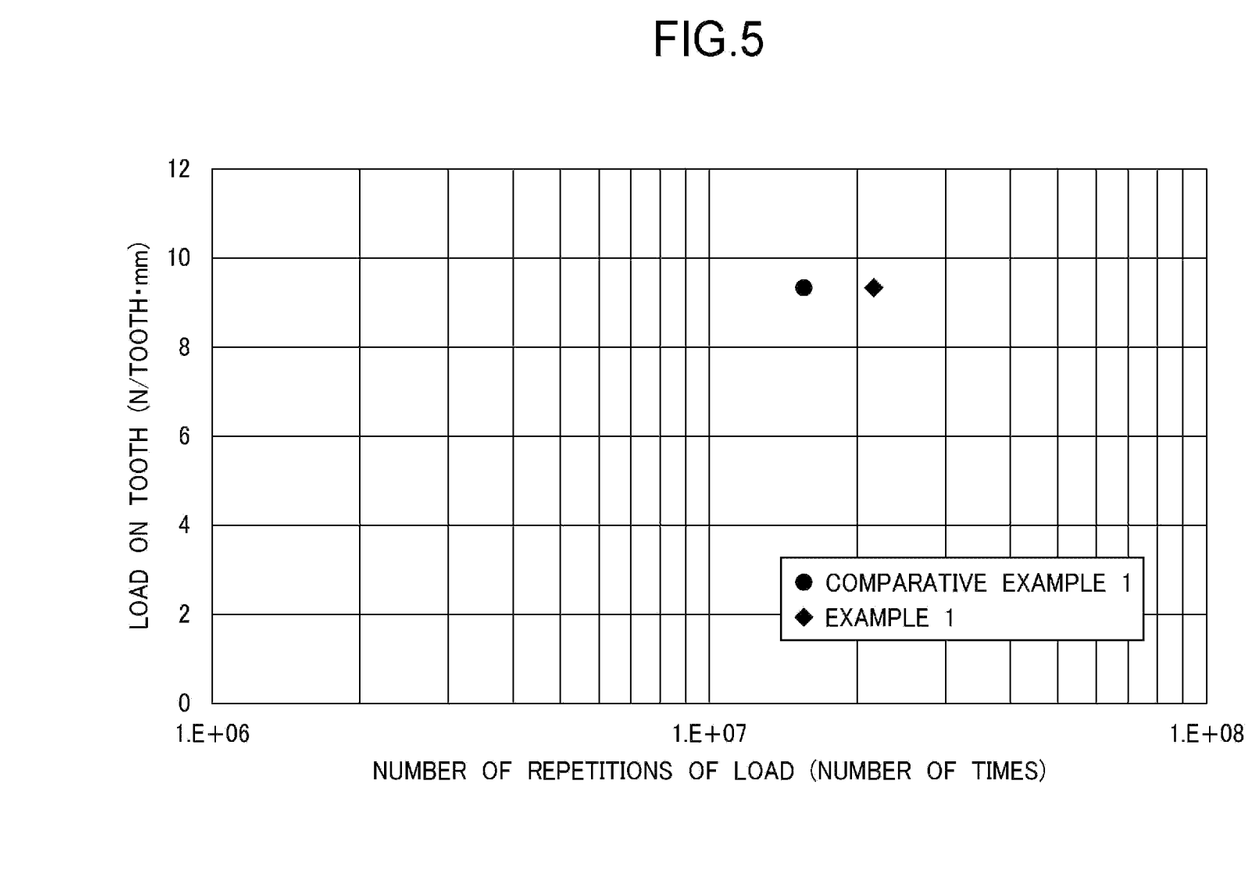
FIG. 5 is a graph showing the results of the high-load durability test.

In this test, the toothed belt 95 was wound around the driving toothed pulley 91 and the driven toothed pulley 92, and the toothed belt 95 was rotated at 4000 rpm in an ambient temperature of 100° C. On the slack side of the belt, tension was applied to the belt from the outside with the idler pulley 93 and from the inside with the idler toothed pulley 94. In addition, while the toothed belt 95 was being rotated, a certain load was repeatedly applied to each tooth of the belt by the driven toothed pulley 92. In this test, the durability of the belt was evaluated by counting the number of repetitions of the applied load until tooth shear occurred in the belt. FIG. 5 shows the results.

First, comparisons are made between Example 1 and Comparative Example 1, between Example 2 and Comparative Example 2, and between Example 8 and Comparative Example 3 with reference to Table 1. These comparisons clearly show that not only the peeling strength, but also the physical properties of the rubber, such as the high-temperature tear strength, were improved in each of the cases where the internal adhesive agents (resorcinol and the hexamethoxy methylol melamine compound) were incorporated into the rubber composition. As is apparent from comparison between Example 3 and Comparative Example 4, this trend was equally observed not only in the cases where HNBR alone was used as the rubber component, but also in the cases where a mixture of HNBR and HXNBR was used as the rubber component. When the peeling strength and the physical properties of the rubber, such as the tear strength, are improved as described above, the durability of a belt used in a high-load and high-temperature environment can be enhanced, as shown in the results of the high-load durability test in FIG. 5.

Moreover, from comparison of Examples 1, 2, 8, and 9, it is apparent that physical properties—especially the high-temperature physical properties—of the rubber such as the tensile stress at break and the tear strength tended to be enhanced when the amount of the short fiber was greater than 10 parts by weight, whereas the peeling strength tended to slightly decrease when the amount of the short fiber was greater than 10 parts by weight. Conceivably, it is most effective to incorporate the short fiber in an amount of about 12 to 16 parts by weight in consideration of both the physical properties of the rubber and the peeling strength. Note that, presumably, the decrease in peeling strength with the increase in the amount of short fiber was caused because large amounts of adhesive agents in the rubber near the fabric or the cord were consumed by the reaction of the short fiber with RFL.

In addition, as is apparent from a comparison of Examples 2 and 4 to 7, the peeling strength improved with the increase in incorporated amounts of the internal adhesive agent; however, the tensile stresses at break (in particular, under the hot condition) peaked at the incorporated amounts of Example 2 (resorcinol: 1.5 parts by weight and the melamine compound: 0.9 parts by weight), and gradually decreased with increasing amounts of the adhesive agents. Meanwhile, the tear strength under the hot condition peaked at the incorporated amounts of Example 5 (resorcinol: 3.0 parts by weight and the melamine compound: 1.8 parts by weight), and gradually decreased with further increasing amounts. For these reasons, as for the Examples, it is conceivably most effective to incorporate the melamine compound in an amount of about 0.9 to 1.8 parts by weight and resorcinol in an amount of about 1.5 to 3.0 parts by weight into the rubber composition, in consideration of the physical properties of the rubber.

Moreover, as for the rubber compositions into which the short fiber was not incorporated, the addition of the internal adhesive agents did not substantially improve the physical properties of the rubber themselves, as is apparent from a comparison between Comparative Example 5 and Example 11. Meanwhile, the peeling strength with respect to the cord was increased by the addition of the internal adhesive agents. However, as for the fabric, peeling did not occur at the interface between the fabric and the rubber in any case, but breakage of the rubber did occur, and no significant difference was observed. For these reasons, when these results are taken into consideration in combination with the results of the other Examples, it can be understood that when the short fiber is incorporated, greater improvements can be expected in the peeling strength and physical properties of the rubber with the addition of the internal adhesive agents. Moreover, from a comparison of Examples 2 and 10 and Comparative Example 2, it can be understood that the short fiber subjected to RFL treatment more effectively improved the physical properties of the rubber.

Note that, as is apparent from a comparison of Examples 12 and 13 and Comparative Example 6, when the internal adhesive agents were incorporated in relatively large amounts in a case where EPDM was used as the rubber component, the tensile stress at break, the tear strength, and the like were not sufficiently improved, although the peeling strength was improved.

The invention claimed is:

1. A method of manufacturing a power transmission belt, comprising molding a rubber portion constituting at least part of the power transmission belt by vulcanizing a rubber composition including rubber, resorcinol and a melamine compound;
    wherein the rubber portion includes a hydrogenated nitrile rubber; and
    wherein the power transmission belt is a toothed belt with tooth rubber, and the rubber portion constitutes at least a part of the tooth rubber;
    wherein the incorporated amount by weight of the melamine compound is less than that of the resorcinol.

2. A power transmission belt, comprising a rubber portion which is molded by vulcanizing a rubber composition including rubber, resorcinol and a melamine compound;
    wherein the rubber portion includes a hydrogenated nitrile rubber; and
    wherein the power transmission belt is a toothed belt with tooth rubber, and the rubber portion constitutes at least a part of the tooth rubber;
    wherein the incorporated amount by weight of the melamine compound is less than that of the resorcinol.

3. The method according to claim 1, wherein the melamine compound is a hexamethoxy methylol melamine compound.

4. The power transmission belt of claim 2 wherein the resorcinol amount is from 0.3 to 8 parts by weight per 100 parts by weight of the matrix of the rubber composition, and the melamine compound amount is from 0.2 to 5 parts by weight per 100 parts by weight of the matrix of the rubber composition.

5. The power transmission belt according to claim 2, wherein the melamine compound is a hexamethoxy methylol melamine compound.

6. The power transmission belt according to claim 2, wherein the rubber portion is adhered to a cord or fabric, or the rubber portion loads a short fiber embedded therein.

7. The power transmission belt according to claim 6, wherein at least one of the cord, the fabric and the short fiber is subjected to RFL treatment.

8. The power transmission belt according to claim 2, wherein an aramid short fiber having a fiber length of about 0.5 to 10 mm is embedded within the rubber portion.

9. The power transmission belt according to claim 2, wherein the rubber composition further includes silica.

10. The power transmission belt according to claim 2, wherein the power transmission belt is a toothed belt including a cord, a tooth rubber disposed on one surface side, a backing rubber disposed on the other surface side, and a facing fabric covering one surface side of the tooth rubber, the one surface side and the other surface side being located across the cord from one another, and
    at least the one surface side of the tooth rubber is formed by the rubber portion, and the facing fabric is adhered to the rubber portion.

* * * * *